United States Patent
Peters

(10) Patent No.: US 12,035,655 B2
(45) Date of Patent: Jul. 16, 2024

(54) CONTROL SYSTEMS FOR AUTOMATED HEADER REEL REPOSITIONING, WORK MACHINES INCORPORATING THE SAME, AND METHODS OF OPERATING WORK MACHINES

(71) Applicant: DEERE & COMPANY, Moline, IL (US)

(72) Inventor: John L. Peters, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 505 days.

(21) Appl. No.: 17/108,717

(22) Filed: Dec. 1, 2020

(65) Prior Publication Data
US 2022/0167556 A1 Jun. 2, 2022

(51) Int. Cl.
*A01D 41/14* (2006.01)
*A01D 41/127* (2006.01)
*A01D 57/04* (2006.01)

(52) U.S. Cl.
CPC ......... *A01D 41/141* (2013.01); *A01D 41/127* (2013.01); *A01D 57/04* (2013.01)

(58) Field of Classification Search
CPC .... A01D 41/141; A01D 41/127; A01D 57/04; A01D 57/12; A01D 34/006; A01D 41/145; A01D 41/148; A01D 41/1271; A01D 75/182
See application file for complete search history.

(56) References Cited

U.S. PATENT DOCUMENTS

| | | | | |
|---|---|---|---|---|
| 4,218,864 | A * | 8/1980 | Allemeersch | A01D 41/142 56/11.8 |
| 5,261,216 | A * | 11/1993 | Schumacher, II | A01D 41/14 56/14.4 |
| 5,778,644 | A | 7/1998 | Keller et al. | |
| 6,381,932 | B1 * | 5/2002 | Clauss | A01D 57/04 56/10.2 J |
| 7,452,267 | B2 * | 11/2008 | Bundy | A01D 75/182 460/6 |

(Continued)

FOREIGN PATENT DOCUMENTS

CA 2697813 A1 10/2010

OTHER PUBLICATIONS

John Deere Article; "Grain Quality Delivery System"; 18 Pages; (DSAM 42581 Litho. in U.S.A (8-12)).

(Continued)

*Primary Examiner* — Thomas B Will
*Assistant Examiner* — Julia C Tran
(74) *Attorney, Agent, or Firm* — Taft Stettinius & Hollister LLP; Stephen F. Rost

(57) ABSTRACT

A work machine includes a chassis, a header, and a control system. The header is coupled to the chassis and positioned to remove crop material from the ground. The header includes a reel to draw crop material into the header so that the crop material may be conveyed rearwardly and a plurality of actuators to move the reel relative to a frame of the header in use of the work machine. The control system is coupled to the chassis and includes a controller communicatively coupled to the plurality of actuators and a single user input communicatively coupled to the controller that is configured to provide an input signal to the controller.

13 Claims, 8 Drawing Sheets

(56) References Cited

U.S. PATENT DOCUMENTS

| | | |
|---|---|---|
| 8,186,136 B2 | 5/2012 | Eick et al. |
| 9,955,628 B2 * | 5/2018 | Gonzalez-Mohino ........................ A01D 69/025 |
| 10,255,670 B1 | 4/2019 | Wu et al. |
| 10,721,859 B2 | 7/2020 | Wu et al. |
| 11,497,165 B2 * | 11/2022 | Ricketts ................. A01D 57/20 |
| 2010/0251682 A1 * | 10/2010 | Eick ....................... A01D 41/14 56/11.2 |
| 2016/0262308 A1 * | 9/2016 | van Vooren ......... A01D 41/127 |
| 2021/0120743 A1 * | 4/2021 | Trowbridge ......... A01D 61/002 |
| 2021/0137006 A1 * | 5/2021 | Shearer ................. A01D 57/04 |
| 2022/0217910 A1 * | 7/2022 | McKinney ........... A01D 41/141 |

OTHER PUBLICATIONS

John Deere Article; p. 19 for relevant context; "Header Engage Switch (Yellow)"; 1 Page.

* cited by examiner

CONTROL SYSTEMS FOR AUTOMATED HEADER REEL REPOSITIONING, WORK MACHINES INCORPORATING THE SAME, AND METHODS OF OPERATING WORK MACHINES

FIELD OF THE DISCLOSURE

The present disclosure relates, generally, to work machines including headers and, more specifically, to work machines having control systems to automate functions of headers.

BACKGROUND

Some work machines may include headers positioned to remove crop material from the ground. In use thereof, plugs and/or blockages may obstruct the flow of crop material through the headers of work machines. In some cases, reels incorporated into such headers may require repositioning to clear plugs. Devices and/or systems to facilitate clearance of plugs and/or blockages encountered during the use of work machines remain an area of interest.

SUMMARY

The present disclosure may comprise one or more of the following features and combinations thereof.

According to one aspect of the present disclosure, a work machine may include a chassis, a header, and a control system. The header may be coupled to the chassis and positioned to remove crop material from the ground. The header may include a reel to draw crop material into the header so that the crop material may be conveyed rearwardly and a plurality of actuators to move the reel relative to a frame of the header in use of the work machine. The control system may be coupled to the chassis. The control system may include a controller communicatively coupled to the plurality of actuators and a single user input communicatively coupled to the controller that is configured to provide an input signal to the controller. The controller may include memory having instructions stored therein and a processor communicatively coupled to the memory. The instructions may be executable by the processor to cause the processor to drive movement of the reel relative to the frame through the plurality of actuators in response to receipt of the input signal without manual manipulation of any other device separate from the single user input by a user.

In some embodiments, the single user input may be configured for manual manipulation by a user. The single user input may be separate from a control handle that may be manually manipulated by a user to drive movement of the reel relative to the frame through the plurality of actuators. The single user input may be separate from a reverse switch that may be manually manipulated by a user to direct operation of the work machine in one or more reverse operating modes.

In some embodiments, receipt of the input signal by the controller may be indicative of a blockage in a flow of crop material rearwardly through the header in use of the work machine. Receipt of the input signal by the controller may initiate performance of an operational sequence by the controller to clear the blockage, and to perform the operational sequence, the instructions may be executable by the processor to cause the processor to direct operation of the plurality of actuators to sequentially move the reel upwardly away from a harvest position to a raised position, move the reel rearwardly away from the raised position to a rearward position, move the reel downwardly away from the rearward position to a lowered position, and move the reel forwardly away from the lowered position to the harvest position.

In some embodiments, the work machine may include at least one camera coupled to the chassis and communicatively coupled to the controller, and the at least one camera may be configured to provide camera input to the controller indicative of an absence of a blockage in a flow of crop material rearwardly through the header in use of the work machine. Receipt of the input signal by the controller may initiate performance of an operational sequence by the controller, and to perform the operational sequence, the instructions may be executable by the processor to cause the processor to receive the camera input from the at least one camera and determine the absence of the blockage based on the camera input. To perform the operational sequence, the instructions may be executable by the processor to cause the processor to direct operation of the plurality of actuators to sequentially move the reel upwardly away from a harvest position to a raised position, move the reel rearwardly away from the raised position to a rearward position, move the reel downwardly away from the rearward position to a lowered position, and move the reel forwardly away from the lowered position to the harvest position.

According to another aspect of the present disclosure, a control system for a work machine including a chassis and a header coupled to the chassis that has a reel to draw crop material into the header and a plurality of actuators to move the reel relative to a frame of the header may include a single user input and a controller. The single user input may be configured to provide an input signal. The controller may be communicatively coupled to the single user input and to the plurality of actuators. The controller may include memory having instructions stored therein and a processor communicatively coupled to the memory. The instructions may be executable by the processor to cause the processor to drive movement of the reel relative to the frame through the plurality of actuators in response to receipt of the input signal without manual manipulation of any other device separate from the single user input by a user.

In some embodiments, the single user input may be configured for manual manipulation by a user. The single user input may be separate from a control handle that may be manually manipulated by a user to drive movement of the reel relative to the frame through the plurality of actuators, and the single user input may be separate from a reverse switch that may be manually manipulated by a user to direct operation of the work machine in one or more reverse operating modes.

In some embodiments, receipt of the input signal by the controller may be indicative of a blockage in a flow of crop material rearwardly through the header in use of the work machine. Receipt of the input signal by the controller may initiate performance of an operational sequence by the controller to clear the blockage, and to perform the operational sequence, the instructions may be executable by the processor to cause the processor to direct operation of the plurality of actuators to sequentially move the reel upwardly away from a harvest position to a raised position, move the reel rearwardly away from the raised position to a rearward position, move the reel downwardly away from the rearward position to a lowered position, and move the reel forwardly away from the lowered position to the harvest position.

In some embodiments, the control system may include at least one camera communicatively coupled to the controller, and the at least one camera may be configured to provide camera input to the controller indicative of an absence of a blockage in a flow of crop material rearwardly through the header in use of the work machine. Receipt of the input signal by the controller may initiate performance of an operational sequence by the controller, and to perform the operational sequence, the instructions may be executable by the processor to cause the processor to receive the camera input from the at least one camera and determine the absence of the blockage based on the camera input. To perform the operational sequence, the instructions may be executable by the processor to cause the processor to direct operation of the plurality of actuators to sequentially move the reel upwardly away from a harvest position to a raised position, move the reel rearwardly away from the raised position to a rearward position, move the reel downwardly away from the rearward position to a lowered position, and move the reel forwardly away from the lowered position to the harvest position.

According to yet another aspect of the present disclosure, a method of operating a work machine including a chassis, a header coupled to the chassis that has a reel to draw crop material into the header and a plurality of actuators to move the reel relative to a frame of the header, and a control system having a single user input configured to provide an input signal and a controller communicatively coupled to the single user input and to the plurality of actuators may include directing, by the controller, operation of the work machine such that the reel is in the harvest position, receiving, by the controller, the input signal from the single user input without receiving input from any other device separate from the single user input, and driving, by the controller, movement of the reel relative to the frame through the plurality of actuators in response to receiving the input signal.

In some embodiments, the method may include receiving, by the controller, camera input from at least one camera indicative of an absence of a blockage in a flow of crop material rearwardly through the header in use of the work machine, and determining, by the controller, the absence of the blockage based on the camera input. Driving movement of the reel relative to the frame through the plurality of actuators may include moving, by the controller through the plurality of actuators, the reel upwardly away from the harvest position to a raised position, moving, by the controller through the plurality of actuators, the reel rearwardly away from the raised position to a rearward position, moving, by the controller through the plurality of actuators, the reel downwardly away from the rearward position to a lowered position, and moving, by the controller through the plurality of actuators, the reel forwardly away from the lowered position to the harvest position.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
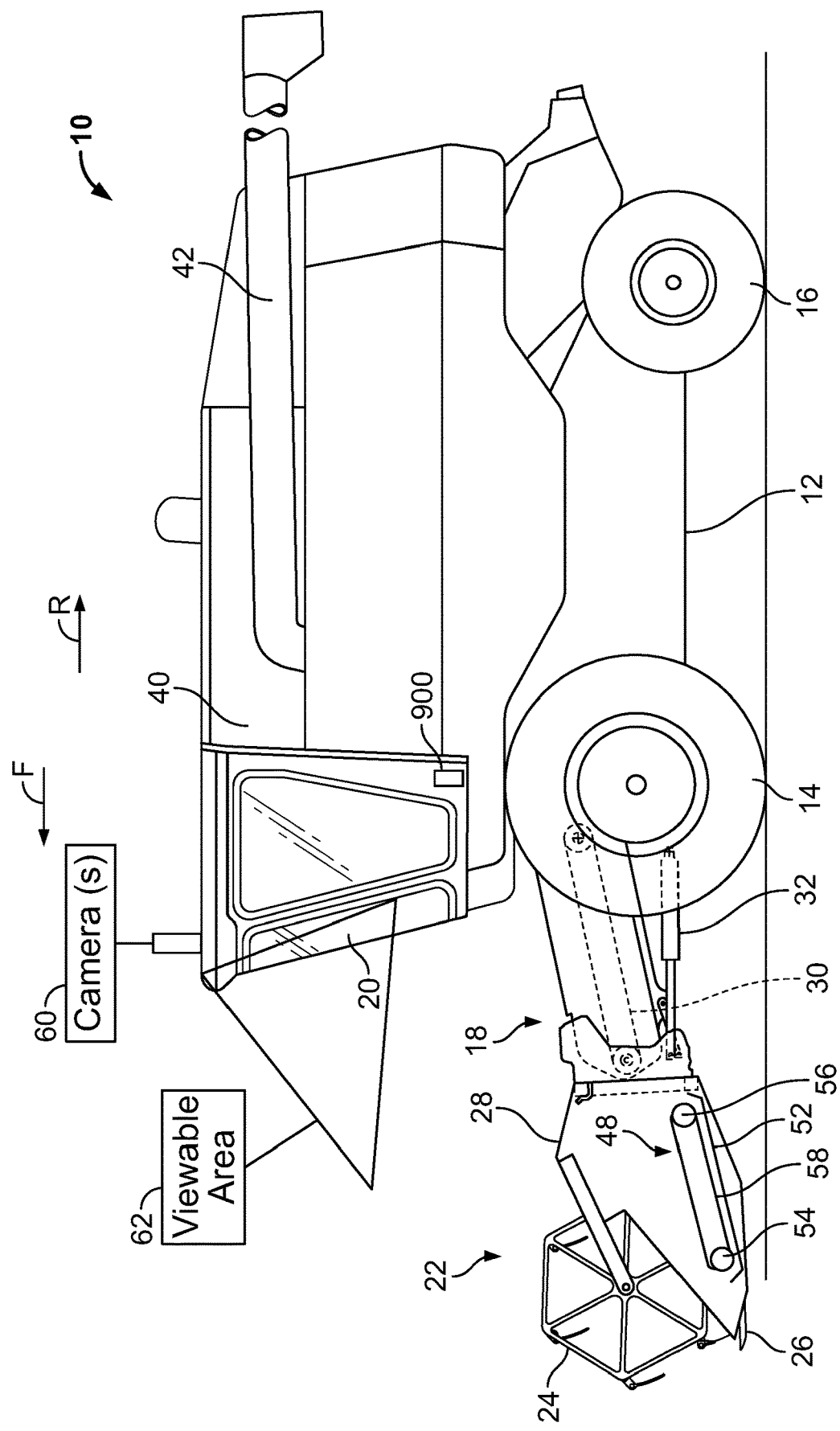
FIG. 1 is a side elevation view of a work machine incorporating a header.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, an illustrative work machine or agricultural vehicle 10 is embodied as, or otherwise includes, a combine harvester. The illustrative work machine 10 is embodied as, or otherwise includes, equipment adapted for use in one or more agricultural applications. However, it should be appreciated that in other embodiments, the work machine 10 may be embodied as, included in, or otherwise adapted for use with, equipment used in lawn and garden, construction, landscaping and ground care, golf and sports turf, forestry, engine and drivetrain, or government and military applications, for example.

Additionally, in some embodiments, the work machine 10 of the present disclosure may be embodied as, included in, or otherwise adapted for use with, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment. Of course, in such embodiments, it should be appreciated that the work machine 10 may be adapted for use in a variety of applications, such as those described above.

In some embodiments still, the work machines contemplated by the present disclosure may be utilized in other applications. Such applications may include, but are not limited to, stationary equipment, systems, or devices, off-road vehicles and/or equipment, over-the-road vehicles and/or equipment, aerospace vehicles and/or equipment, rail vehicles and/or equipment, and ships and/or shipping equipment, as the case may be.

Figure 9:
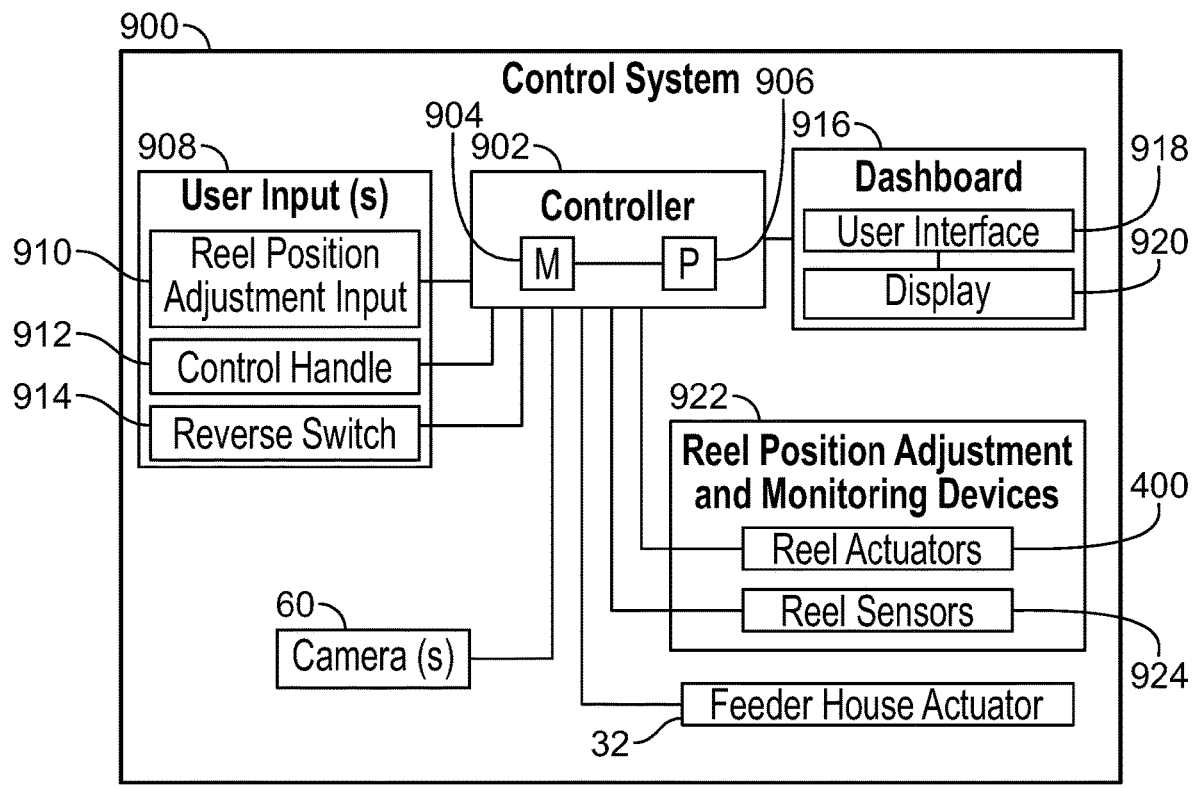
FIG. 9 is a diagrammatic view of a control system that may be included in the work machine of FIG. 1.

In the illustrative embodiment, the work machine 10 includes a chassis or mainframe 12, a header 22, and a control system (e.g., the control system 900 depicted in FIG. 9). The header 22 is coupled to the chassis 12 and positioned to remove crop material from the ground in use of the work machine 10. The header 22 includes a reel 24 to draw crop material into the header 22 so that the crop material may be conveyed rearwardly in a direction indicated by arrow R. Additionally, the header 22 includes a plurality of actuators (e.g., the actuators 400 shown in FIG. 4) to move the reel 24 relative to a frame or bearing frame 28 of the header 22 in use of the work machine 10.

The illustrative control system 900 is coupled to the chassis 12 and includes a controller 902 communicatively coupled to the plurality of actuators 400 and a single user input 910 communicatively coupled to the controller 902 that is configured to provide an input signal to the controller 902. For the purposes of the present disclosure, the input signal provided by the user input 910 is indicative of a command (e.g., by a user or operator) to perform automatic adjustment of the position of the reel 24. As such, the user input 910 may be referred to herein as, and/or depicted as, a reel position adjustment input (e.g., see FIG. 9).

In any case, the illustrative controller 902 includes memory 904 having instructions stored therein and a processor 906 communicatively coupled to the memory 904. In the illustrative embodiment, the instructions are executable by the processor 906 to cause the processor 906 to drive movement of the reel 24 relative to the frame 28 through the plurality of actuators 400 in response to receipt of the input signal provided by the user input 910 without manual manipulation of any other device separate from the user input 910 by a user. In other words, only the input signal provided by the user input 910 may be used to cause the controller 902 to drive movement of the reel 24 relative to the frame 28 through the plurality of actuators 400. Accordingly, the input signal provided by the user input 910 may cause the controller 902 to drive movement of the reel 24 relative to the frame 28 independently of other user inputs, such as the control handle 912 and the reverse switch 914 described in greater detail below with reference to FIG. 9, for example.

The chassis 12 is illustratively supported on the ground by driven front wheels 14 and steerable rear wheels 16 such that the chassis 12 is movable over a field. It should be appreciated that in some embodiments, caterpillar drives could also be used in place of the wheels 14, 16. A feeder house 18 is mounted near a front end of the chassis 12. The header 22, which includes the reel 24, a cutter bar 26, and the frame 28, among other things, is removably coupled to the feeder house 18 near a front end thereof. In some embodiments, the header 22 may be referred to as a draper belt header.

A cabin 20 is illustratively mounted on the chassis 12 above the front wheels 14. The feeder house 18 includes a conveyor 30 and is pivotable by an actuator 32 relative to the chassis 12 about an axis which extends horizontally and transversely to the forward direction indicated by arrow F. In some embodiments, the axis may coincide with a rotational axis of an upper guide roller of the conveyor 30 in order to be able to modify the height of the header 22 or of the height of another attachment mounted on the feeder house 18 in place of the header 22 above the ground depending on the particular application. The actuator 32 is communicatively coupled to the controller 902 as shown in FIG. 9.

Although not shown in FIG. 1, it should be appreciated that the chassis 12 at least partially houses a number of devices and/or systems in an interior thereof, such as one or more threshing device(s), separating device(s), and cleaning device(s), for example. The chassis 12 at least partially defines a tank 40 that may be used to store cleaned crop materials (e.g., grain) prior to removal and unloading onto a transport vehicle by an unloading conveyor 42.

In the illustrative embodiment, the work machine 10 includes one or more cameras 60 coupled to the chassis 12. The camera(s) 60 may be mounted on top of the cabin 20, at least in some embodiments. The camera(s) 60 are configured to capture one or more images of one or more components of the work machine 10 and/or the header 22. As further described below, in use of the work machine 10, the camera(s) 60 are each configured to provide camera input to the controller 902 indicative of an absence or a presence of a blockage in a flow of crop material rearwardly through the header 22.

The camera(s) 60 are each illustratively embodied as, or otherwise include, any device capable of capturing and/or storing one or more images of one or more components of the work machine 10 and/or the header 22 in use thereof, such as a digital camera, a panoramic camera, or the like, for example. In some embodiments, the camera(s) 60 may be included in, coupled to, or otherwise adapted for use with, a vision system. In any case, in the illustrative embodiment, the camera(s) 60 are coupled to the chassis 12 such that each camera 60 has a viewable area 62. It should be appreciated that in the illustrative embodiment, the viewable area 62 includes, or is otherwise embodied as, an area in which a blockage, plug, or obstruction (or a lack thereof) of the flow of crop material through the header 22 may be viewed or otherwise detected by the camera 60.

Figure 2:
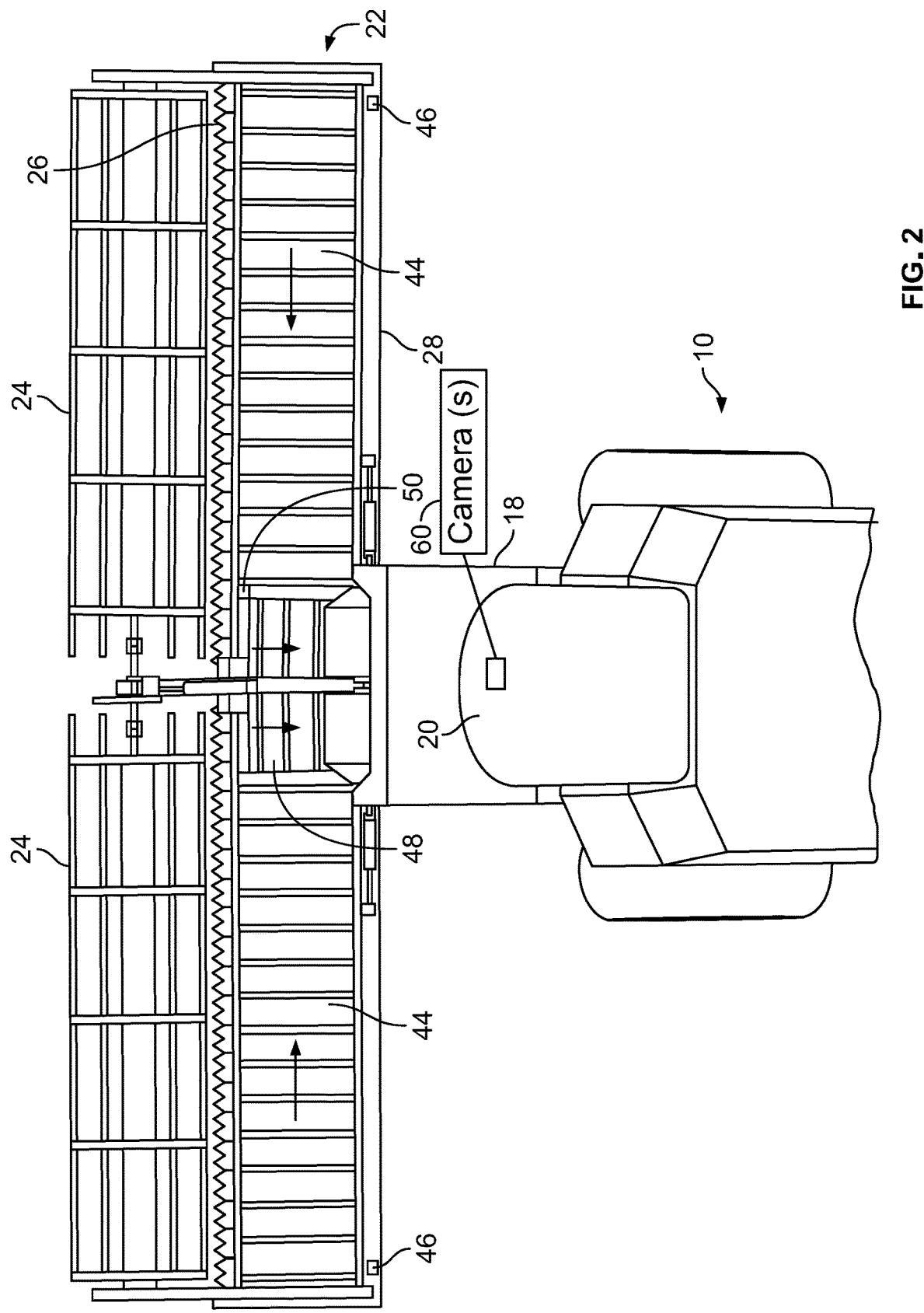
FIG. 2 is a top view of a front portion of the work machine and the header depicted in FIG. 1.

Referring now to FIG. 2, the header 22 illustratively includes two outer belt conveyors 44 each connected to a drive 46 which drives them (e.g., in a harvesting mode) such that their top sides move inwardly (i.e., as shown by the arrows). As a result, the outer belt conveyors 44 convey harvested crop material captured by the reel 24 and severed by the cutter bar 26 to the center of the header 22. Crop material conveyed to the center of the header 22 is then conveyed by a central belt conveyor 48 that is driven by a drive 50 and transported rearwardly into the feeder house 18.

The central belt conveyor 48 illustratively includes a conveyor belt 58 which circulates about two guide rollers 54, 56, one of which is coupled with the drive 50. The drive 50 may drive the rear guide roller 56 or the front guide roller 54. A pan 52, in which harvested crop may accumulate (e.g., in harvesting mode) from quantities that are output forward by the central belt conveyor 48 but nonetheless entrained rearward due to incoming harvested crop material, is arranged beneath the conveyor belt 58.

Figure 3:
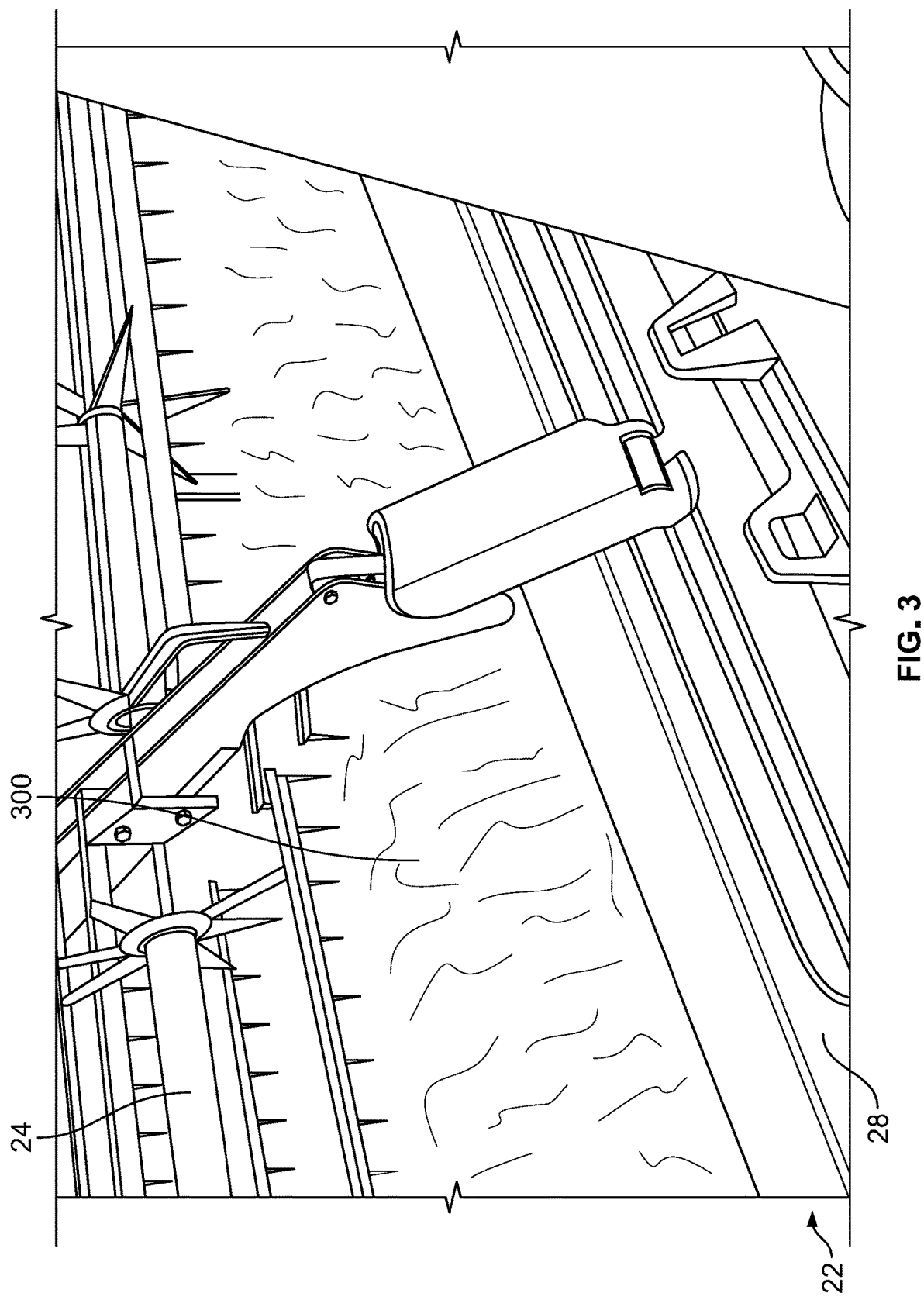
FIG. 3 is a perspective view of a plug or blockage of crop material flow through a header such as the header shown in FIG. 1.

Referring now to FIG. 3, a blockage or plug 300 may be encountered in use of the header 22 that prevents the flow of crop material through the header 22 to the feeder house 18 for subsequent downstream processing. It should be appreciated that the blockage 300 may be caused by, or otherwise associated with, an excess accumulation of crop material, soil, debris, particulates, foreign matter, or the like. Additionally, in some cases, the blockage 300 may be caused by, or otherwise associated with, a stationary obstacle or object. Regardless, as discussed below, the illustrative camera(s) 60 are configured to capture images of the blockage 300 or the absence of the blockage 300 so that the images may be communicated to the controller 902 to facilitate detection thereof and/or clearance thereof.

In some embodiments, the blockage 300 may provide, or otherwise be attributed to, an audible event indicating the presence of the blockage 300. In one example, a noise emitted by a torque-transmitting mechanism (e.g., a clutch, brake, shaft, gear, or the like) may indicate the presence of the blockage 300. In other embodiments, however, the blockage 300 may provide, or otherwise be attributed to, another event. For example, the blockage 300 may be associated with a decrease in a measured rotational speed of a component of the header 22 in use of the work machine 100, at least in some embodiments.

Figure 4:
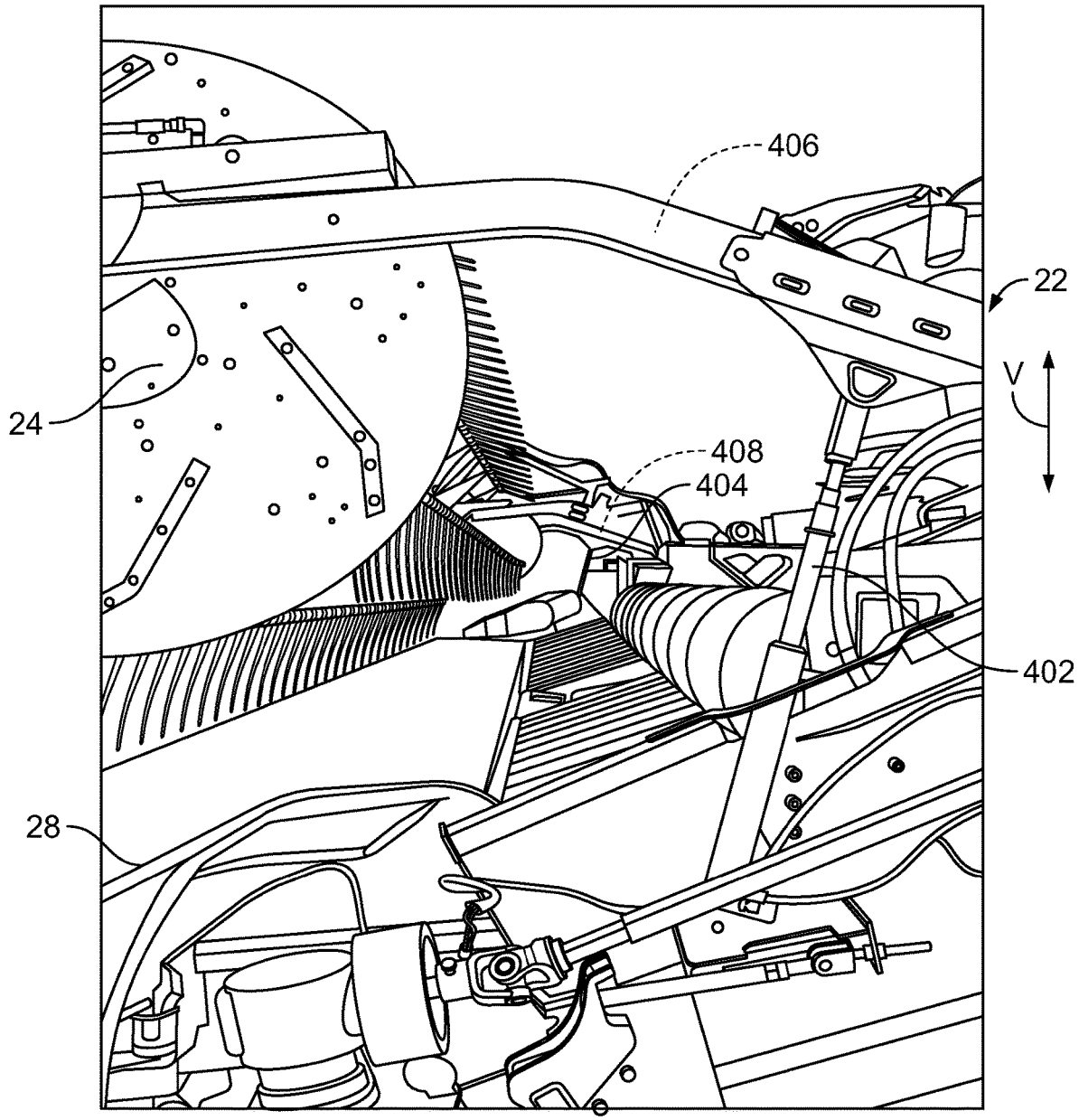
FIG. 4 is a side elevation view of a header such as the header shown in FIG. 1 depicting a plurality of actuators.

Referring now to FIG. 4, each of the plurality of actuators 400 is illustratively embodied as, or otherwise includes, any device capable of driving movement of the reel 24 relative to the frame 28 in coordination with the controller 902. In some embodiments, each of the actuators 400 may be embodied as, or otherwise include, a double-acting hydraulic cylinder that is extendable and retractable to vary a length thereof. In other embodiments, however, each of the actuators 400 may be embodied as, or otherwise include, another suitable device, such as an electrically-driven linear actuator, a pneumatic actuator, or another hydraulically-operated actuator, for example.

In the illustrative embodiment, the actuators 400 include four actuators 402, 404, 406, 408. In some embodiments, in coordination with the controller 902, the actuators 402, 404 may be extendable and retractable to cooperatively move the reel 24 upwardly and downwardly relative to the frame 28 in a vertical direction indicated by arrow V. Additionally, in some embodiments, in coordination with the controller 902, the actuators 406, 408 may be extendable and retractable to move the reel 24 rearwardly (i.e., in the direction indicated by arrow R) and forwardly (i.e., in the direction indicated by arrow F) relative to the frame 28. Of course, it should be appreciated that in other embodiments, the actuators 400 may include another suitable number of actuators capable of driving movement of the reel 24 relative to the frame 28 in other suitable directions.

Referring now to FIGS. 5-8, it should be appreciated that in coordination with the controller 902, the plurality of actuators 400 are configured to drive movement of the reel 24 relative to the frame 28 to arrange the reel 24 in any one of the positions further described below. Furthermore, it should be appreciated that the arrangement of the reel 24 relative to the frame 28 is not limited to the positions mentioned below, and that other positions of the reel 24 relative to frame 28 may be attained in use of the header 22 and the work machine 10.

Figure 5:
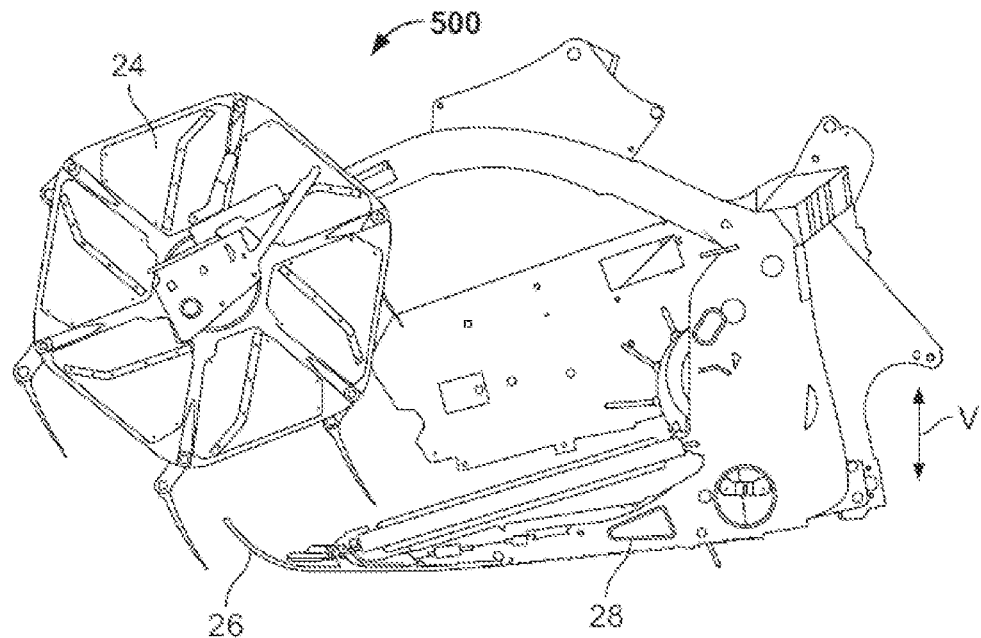
FIG. 5 is a sectional view of a header such as the header shown in FIG. 4 with a reel of the header in a harvest position.

In the harvest position 500 of the reel 24 shown in FIG. 5, the reel 24 is positioned in relatively close proximity to the cutter bar 26 and the ground to draw crop material severed from the ground by the cutter bar 26 into the header 22. As such, the harvest position 500 may correspond to, or otherwise be associated with, a normal operating position of the reel 24 in use of the header 22 and the work machine 10. Subsequent to experiencing a blockage or plug when the reel 24 is in the harvest position 500, to clear the blockage or plug, the reel 24 is sequentially moved from the harvest position 500 to the raised position 600, from the raised position 600 to the rearward position 700, from the rearward position 700 to the lowered position 800, and from the lowered position 800 back to the harvest position 500.

Figure 6:
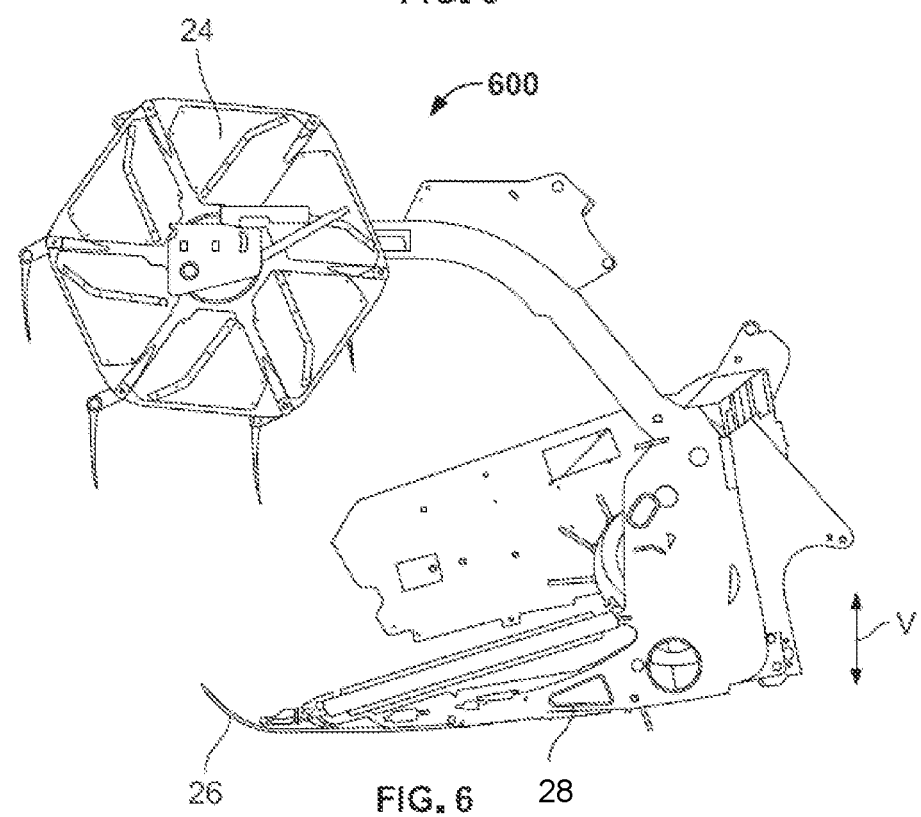
FIG. 6 is a sectional view of a header such as the header shown in FIG. 4 with the reel in a raised position.

To attain the raised position 600 shown in FIG. 6, the reel 24 is raised upwardly relative to the frame 28 in the vertical direction V away from the harvest position 500. As such, the reel 24 is disposed farther from the cutter bar 26 and the ground in the vertical direction V when the reel 24 is in the raised position 600 compared to when the reel 24 is in the harvest position 500.

Figure 7:
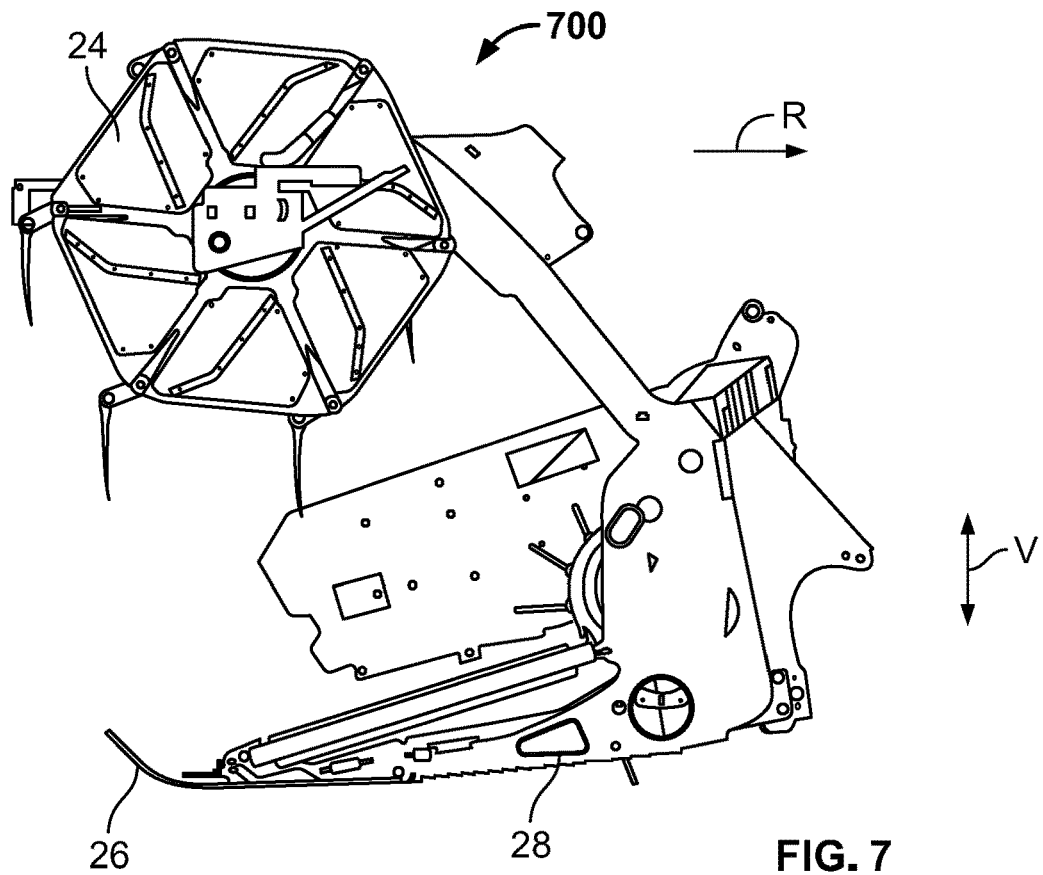
FIG. 7 is a sectional view of a header such as the header shown in FIG. 4 with the reel in a rearward position.

To attain the rearward position 700 shown in FIG. 7, the reel 24 is moved rearwardly (i.e., in the rearward direction indicated by arrow R) away from the raised position 600. However, the vertical spacing between the reel 24 and the cutter bar 26 when the reel 24 is in the rearward position 700 is substantially identical to the vertical spacing between the reel 24 and the cutter bar 26 when the reel 24 is in the raised position 600.

Figure 8:
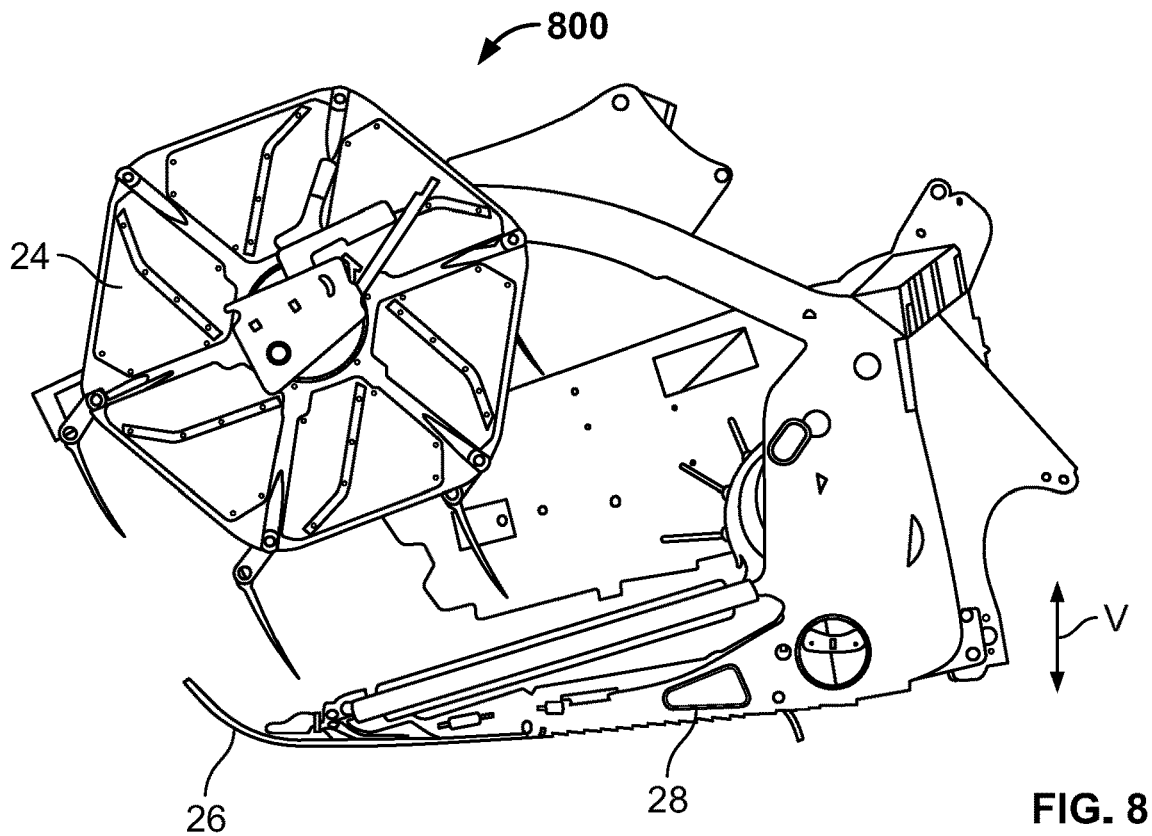
FIG. 8 is a sectional view of a header such as the header shown in FIG. 4 with the reel in a lowered position.

To attain the lowered position 800 shown in FIG. 8, the reel 24 is lowered downwardly relative to the frame 28 in the vertical direction V away from the rearward position 700. However, the rearward positioning of the reel 24 in the rearward position 700 is substantially maintained when the reel 24 is in the lowered position 800.

To return to the harvest position 500 shown in FIG. 5, the reel 24 is moved forwardly (i.e., in the forward direction indicated by arrow R) away from the lowered position 800. It should be appreciated that the vertical spacing between the reel 24 and the cutter bar 26 when the reel 24 is in the lowered position 800 is substantially identical to the vertical spacing between the reel 24 and the cutter bar 26 when the reel 24 is in the harvest position 500.

Referring now to FIG. 9, the illustrative control system 900 includes the controller 902 and a number of devices communicatively coupled to the controller 902. Those devices include, but are not limited to, the following: a collection of user inputs 908, a dashboard 916, a collection of reel position adjustment and monitoring devices 922, the camera(s) 60, and the actuator 32. Of course, it should be appreciated that the controller 902 may be communicatively coupled to other devices that may be included in the control system 900, such as the drives 46, 50, for example.

The memory device 904 of the illustrative controller 902 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 904 may be embodied as a block addressable memory, such as those based on NAND or NOR technologies. The memory device 904 may also include future generation nonvolatile devices, such as a three dimensional crosspoint memory device (e.g., Intel 3D XPoint™ memory), or other byte addressable write-in-place nonvolatile memory devices. In some embodiments, the memory device 904 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The processor 906 of the illustrative controller 902 may be embodied as, or otherwise include, any type of processor, controller, or other compute circuit capable of performing various tasks such as compute functions and/or controlling the functions of the work machine 10. For example, the processor 906 may be embodied as a single or multi-core processor(s), a microcontroller, or other processor or processing/controlling circuit. In some embodiments, the processor 906 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 906 may be embodied as, or otherwise include, a high-power processor, an accelerator co-processor, or a storage controller. In some embodiments still, the processor 906 may include more than one processor, controller, or compute circuit.

The illustrative user inputs 908 include, but are not limited to, the user input 910, the control handle 912, and the reverse switch 914. The illustrative user input 910 is configured for manual manipulation by a user to provide the input signal to the controller 902 and thereby initiate sequential movement of the reel 24 between the positions 500, 600, 700, 800 discussed above, as described in greater detail below with reference to FIG. 10. The user input 910 may be embodied as, or otherwise include, a knob, dial, button, switch, joystick, handle, or the like. The control handle 912 is separately provided from the user input 910 and configured for manual manipulation by a user to drive movement of the reel 24 relative to the frame 28 through the plurality of actuators 400, at least in some embodiments. The reverse switch 914 is separately provided from the user input 910 and configured for manual manipulation by a user to direct operation of the work machine 10 in one or more reverse operating modes, at least in some embodiments. In some embodiments, to clear a blockage in a flow of crop material through the header 22, an operator may, by contemporaneous manipulation of the control handle 912 and the reverse switch 914, move the work machine 10 in a reverse direction while moving the reel 24 between the aforementioned positions 500, 600, 700, 800. However, provision of the user input 910 allows the operator to move the reel 24 between the positions 500, 600, 700, 800 to clear a blockage without necessitating such manipulation of the control handle 912 and the reverse switch 914.

The illustrative dashboard 916 includes a user interface 918 and a display 920 communicatively coupled thereto. The user interface 918 is configured to provide various inputs to the controller 902 based on various actions, which may include actions performed by an operator. In some embodiments, the user inputs 908 may be integrated into, or otherwise form a portion of, the user interface 918. The display 920 is configured to output or display various indications, messages, and/or prompts to an operator, which may be generated by the controller 902.

The illustrative reel position adjustment and monitoring devices 922 include the actuators 400 communicatively coupled to the controller 902 and sensors 924 communicatively coupled to the controller 902. Each of the sensors 924 may be embodied as, or otherwise include, any device capable of sensing one or more operational characteristics of the reel 24, such as a length of one of the actuators 400, an extended state of one of the actuators 400, or a retracted state of one of the actuators 400, for example. Of course, in some embodiments, it should be appreciated that the sensors 924 may be omitted.

Figure 10:
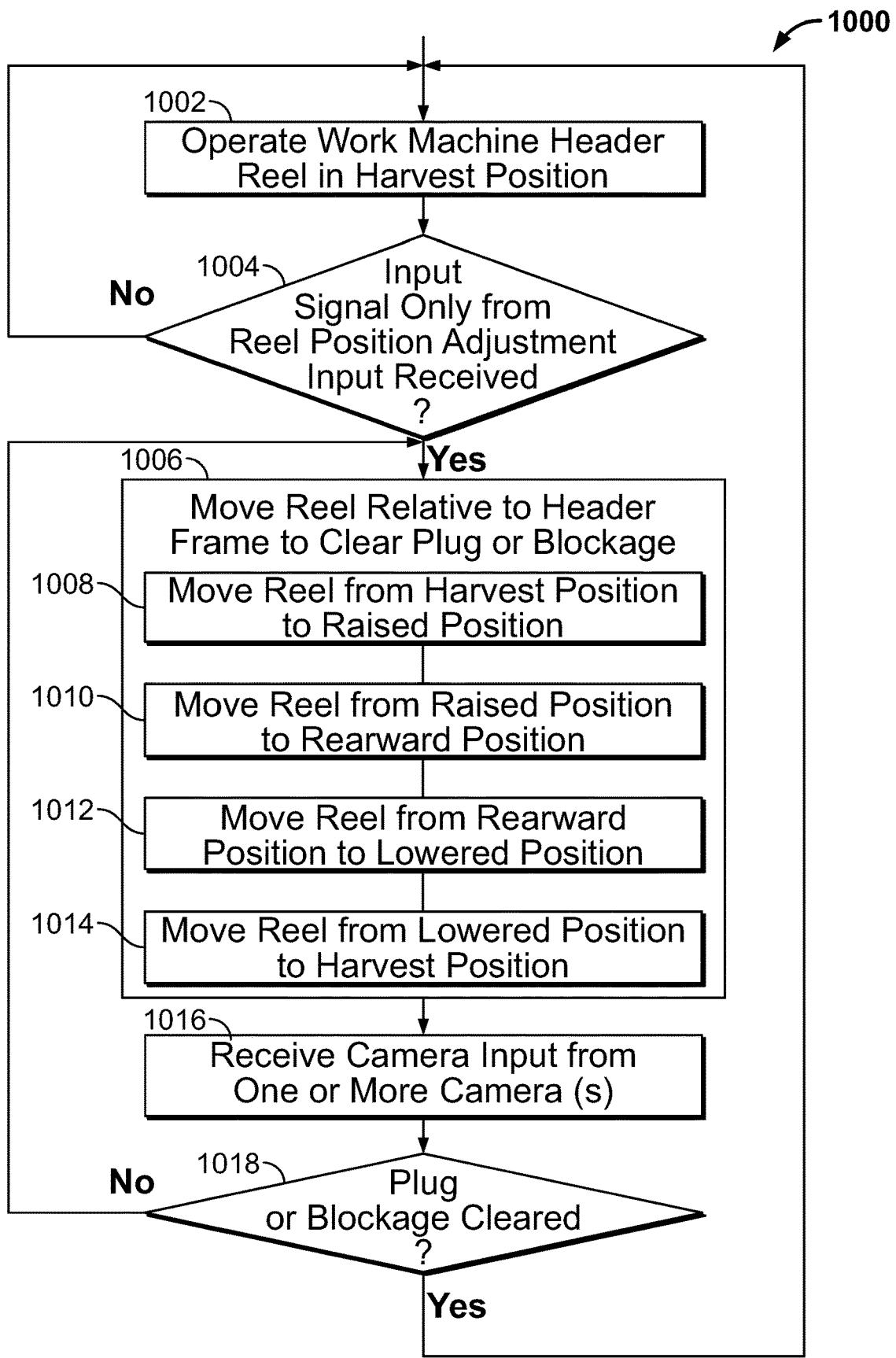
FIG. 10 is a simplified flowchart of a method that may be performed by the controller diagrammatically depicted in FIG. 9.

Referring now to FIG. 10, an illustrative method 1000 of operating the work machine 10 may be embodied as, or otherwise include, a set of instructions that are executable by the control system 900 (i.e., the controller 902). The method 1000 corresponds to, or is otherwise associated with, performance of the blocks described below in the illustrative sequence of FIGS. 10. It should be appreciated, however, that the method 1000 may be performed in one or more sequences different from the illustrative sequence. Additionally, it should be appreciated that one or more blocks of the illustrative method 1000 may be performed in parallel with, or contemporaneously with, one another.

The illustrative method 1000 begins with block 1002. In block 1002, the controller 902 directs operation of the work machine 10 and the header 22 such that the reel 24 is in the harvest position 500. Operation of the work machine 10 in block 1002 may correspond to, or otherwise be associated with, a normal operational state as indicated above. From block 1002, the method 1000 subsequently proceeds to block 1004.

In block 1004 of the illustrative method 1000, the controller 902 determines whether only the input signal from the reel position adjustment input 910 has been received following block 1002. If the controller 902 determines in block 1004 that only the input signal from the user input 910 has been received (i.e., as a result of a user manipulating the input 910), the method 1000 subsequently proceed to block 1006. If the controller 902 determines in block 1004 that the input signal from only the user input 910 has not been received, the method 1000 subsequently returns to block 1002.

In block 1006 of the illustrative method 1000, the controller 902 moves the reel 24 relative to the frame 28 through the actuators 400 to clear a plug or blockage of crop material flow through the header 22. To do so, in the illustrative embodiment, the controller 902 sequentially performs blocks 1008 through 1014. In block 1008, the controller 902 moves the reel 24 through the actuators 400 from the harvest position 500 to the raised position 600 depicted in FIGS. 5 and 6. In block 1010, the controller 902 moves the reel 24 through the actuators 400 from the raised position 600 to the rearward position 700 depicted in FIGS. 6 and 7. In block 1012, the controller 902 moves the reel 24 through the actuators 400 from the rearward position 700 to the lowered position 800 as depicted in FIGS. 7 and 8. In block 1014, the controller 902 moves the reel 24 through the actuators 400 from the lowered position 800 to the harvest position 500 depicted in FIGS. 8 and 5. Performance of block 1014 corresponds to completion of illustrative block 1006. From block 1006, the method 1000 subsequently proceeds to block 1016.

In block 1016 of the illustrative method 1000, the controller 902 receives camera input from the one or more cameras 60. From block 1016, the method 1000 subsequently proceeds to block 1018.

In block 1018 of the illustrative method 1000, based on the camera input received in block 1016, the controller 902 determines whether the plug or blockage encountered by the header 22 has been cleared following performance of block 1006. If the controller 902 determines in block 1018 that the plug or blockage has been cleared (e.g., in response to operator input provided via the dashboard 916), the method 1000 subsequently returns to block 1002. If the controller 902 determines in block 1018 that the plug or blockage has not been cleared (e.g., in response to operator input provided via the dashboard 916), the method 1000 subsequently returns to block 1006.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A work machine comprising:
a chassis;
a cabin mounted on the chassis;
a header coupled to the chassis and positioned to remove crop material from the ground, wherein the header includes a reel to draw crop material into the header so that the crop material may be conveyed rearwardly and a plurality of actuators to move the reel relative to a frame of the header in use of the work machine; and
a control system coupled to the chassis that includes a controller communicatively coupled to the plurality of actuators, a single user input communicatively coupled to the controller that is configured to provide an input signal to the controller, and at least one camera mounted on top of the cabin such that a viewable area of the at least one camera extends forward of the cabin and above the header in a vertical direction, wherein the controller includes memory having instructions stored therein and a processor communicatively coupled to the memory, wherein the instructions are executable by the processor to cause the processor to drive movement of the reel relative to the frame through the plurality of actuators in response to receipt of the input signal without manual manipulation of any other device separate from the single user input by a user, wherein the instructions are executable by the processor to cause the processor to (i) determine whether input has been received from another input device separate from the single user input and (ii) direct operation of the work machine such that the reel is in a harvest position corresponding to a normal operating position of the reel in response to receipt of the input signal and in response to a determination that input has been received from the another input device separate from the single user input,
wherein:
the instructions are executable by the processor to cause the processor to initiate performance of an operational sequence by the controller to clear a blockage of crop material flow through the header in response to receipt of the input signal and in response to a determination that input has not been received from the another input device separate from the single user input,
receipt of the input signal by the controller is indicative of the blockage in a flow of crop material rearwardly through the header in use of the work machine,
to perform the operational sequence, the instructions are executable by the processor to cause the processor to direct operation of the plurality of actuators to sequentially move the reel upwardly away from the harvest position to a raised position, move the reel rearwardly away from the raised position to a rearward position, move the reel downwardly away from the rearward position to a lowered position, and move the reel forwardly away from the lowered position to the harvest position,
to move the reel rearwardly away from the raised position to the rearward position, the instructions are executable by the processor to cause the processor to maintain a vertical spacing between the reel and a cutter bar of the header in each of the raised position and the rearward position, and
to move the reel downwardly away from the rearward position to the lowered position, the instructions are executable by the processor to cause the processor to maintain a rearward spacing between the reel and the cutter bar of the header in each of the rearward position and the lowered position.

2. The work machine of claim 1, wherein the single user input is configured for manual manipulation by a user.

3. The work machine of claim 2, wherein the another input device includes a control handle that may be manually manipulated by a user to drive movement of the reel relative to the frame through the plurality of actuators.

4. The work machine of claim 3, wherein the another input device includes a reverse switch that may be manually manipulated by a user to direct operation of the work machine in one or more reverse operating modes.

5. The work machine of claim 1, wherein the at least one camera is communicatively coupled to the controller, and wherein the at least one camera is configured to provide camera input to the controller indicative of an absence of a blockage in a flow of crop material rearwardly through the header in use of the work machine.

6. The work machine of claim 5, wherein the instructions are executable by the processor to cause the processor to receive the camera input from the at least one camera and determine the absence of the blockage based on the camera input.

7. A control system for a work machine including a chassis and a header coupled to the chassis that has a reel to draw crop material into the header and a plurality of actuators to move the reel relative to a frame of the header, the control system comprising:
   a single user input configured to provide an input signal; and
   a controller communicatively coupled to the single user input and to the plurality of actuators, wherein the controller includes memory having instructions stored therein and a processor communicatively coupled to the memory, wherein the instructions are executable by the processor to cause the processor to drive movement of the reel relative to the frame through the plurality of actuators in response to receipt of the input signal without manual manipulation of any other device separate from the single user input by a user,
   wherein:
   the instructions are executable by the processor to cause the processor to (i) determine whether input has been received from another input device separate from the single user input and (ii) direct operation of the work machine such that the reel is in a harvest position corresponding to a normal operating position of the reel in response to receipt of the input signal and in response to a determination that input has been received from the another input device separate from the single user input,
   the instructions are executable by the processor to cause the processor to initiate performance of an operational sequence by the controller to clear a blockage of crop material flow through the header in response to receipt of the input signal and in response to a determination that input has not been received from the another input device separate from the single user input,
   receipt of the input signal by the controller is indicative of the blockage in a flow of crop material rearwardly through the header in use of the work machine,
   to perform the operational sequence, the instructions are executable by the processor to cause the processor to direct operation of the plurality of actuators to sequentially move the reel upwardly away from the harvest position to a raised position, move the reel rearwardly away from the raised position to a rearward position, move the reel downwardly away from the rearward position to a lowered position, and move the reel forwardly away from the lowered position to the harvest position,
   to move the reel rearwardly away from the raised position to the rearward position, the instructions are executable by the processor to cause the processor to maintain a vertical spacing between the reel and a cutter bar of the header in each of the raised position and the rearward position, and
   to move the reel downwardly away from the rearward position to the lowered position, the instructions are executable by the processor to cause the processor to maintain a rearward spacing between the reel and the cutter bar of the header in each of the rearward position and the lowered position.

8. The control system of claim 7, wherein the single user input is configured for manual manipulation by a user.

9. The control system of claim 8, wherein the another input device includes a control handle that may be manually manipulated by a user to drive movement of the reel relative to the frame through the plurality of actuators, and wherein the another input device includes a reverse switch that may be manually manipulated by a user to direct operation of the work machine in one or more reverse operating modes.

10. The control system of claim 7, further comprising at least one camera communicatively coupled to the controller, wherein the at least one camera is configured to provide camera input to the controller indicative of an absence of a blockage in a flow of crop material rearwardly through the header in use of the work machine.

11. The control system of claim 10, wherein to perform the operational sequence, the instructions are executable by the processor to cause the processor to receive the camera input from the at least one camera and determine the absence of the blockage based on the camera input.

12. A method of operating a work machine including a chassis, a header coupled to the chassis that has a reel to draw crop material into the header and a plurality of actuators to move the reel relative to a frame of the header, and a control system having a single user input configured to provide an input signal and a controller communicatively coupled to the single user input and to the plurality of actuators, the method comprising:
   directing, by the controller, operation of the work machine such that the reel is in a harvest position;
   receiving, by the controller, the input signal from the single user input;
   driving, by the controller, movement of the reel relative to the frame through the plurality of actuators in response to receiving the input signal;
   receiving, by the controller, input from another input device separate from the single user input; and
   maintaining, by the controller, the reel in the harvest position in response to receipt of the input signal from the single user input and in response to receipt of the input from the another input device separate from the single user input,
   wherein:
   driving movement of the reel relative to the frame through the plurality of actuators comprises (i) moving, by the controller through the plurality of actuators, the reel upwardly away from the harvest position to a raised position; (ii) moving, by the controller through the plurality of actuators, the reel rearwardly away from the raised position to a rearward position; (iii) moving, by the controller through the plurality of actuators, the reel downwardly away from the rearward position to a lowered position; and (iv) moving, by the controller through the plurality of actuators, the reel forwardly away from the lowered position to the harvest position;

moving the reel rearwardly away from the raised position to the rearward position comprises maintaining, by the controller through the plurality of actuators, a vertical spacing between the reel and a cutter bar of the header in each of the raised position and the rearward position; and moving the reel downwardly away from the rearward position to the lowered position comprises maintaining, by the controller through the plurality of actuators, a rearward spacing between the reel and the cutter bar of the header in each of the rearward position and the lowered position.

13. The method of claim 12, further comprising:

receiving, by the controller, camera input from at least one camera indicative of an absence of a blockage in a flow of crop material rearwardly through the header in use of the work machine; and determining, by the controller, the absence of the blockage based on the camera input.

* * * * *